(12) United States Patent
Nestico et al.

(10) Patent No.: US 10,343,786 B2
(45) Date of Patent: Jul. 9, 2019

(54) SYSTEM AND METHOD OF OPERATING A DUCTED FAN PROPULSION SYSTEM DURING AIRCRAFT TAXI

(71) Applicant: General Electric Company, Schenectady, NY (US)

(72) Inventors: Brian Francis Nestico, Loveland, OH (US); Melanie Zoe Cox, Liberty Township, OH (US); Martin Kenneth Gabel, Mason, OH (US); Keith Edward James Blodgett, Milford, OH (US)

(73) Assignee: General Electric Company, Schenectady, NY (US)

( * ) Notice: Subject to any disclaimer, the term of this patent is extended or adjusted under 35 U.S.C. 154(b) by 59 days.

(21) Appl. No.: 15/635,356

(22) Filed: Jun. 28, 2017

(65) Prior Publication Data
US 2019/0002118 A1    Jan. 3, 2019

(51) Int. Cl.
| | | |
|---|---|---|
| *B64D 33/04* | (2006.01) | |
| *B64D 27/16* | (2006.01) | |
| *F02K 3/06* | (2006.01) | |
| *F02K 1/72* | (2006.01) | |
| *B64D 29/06* | (2006.01) | |

(52) U.S. Cl.
CPC ............ *B64D 33/04* (2013.01); *B64D 27/16* (2013.01); *B64D 29/06* (2013.01); *F02K 1/72* (2013.01); *F02K 3/06* (2013.01); *F05D 2220/323* (2013.01); *F05D 2260/50* (2013.01)

(58) Field of Classification Search
CPC ........ B64D 33/04; B64D 29/06; B64D 27/16; F02K 3/06; F02K 1/72; F05D 2260/50; F05D 2220/323
See application file for complete search history.

(56) References Cited

U.S. PATENT DOCUMENTS

| | | | |
|---|---|---|---|
| 4,567,786 A * | 2/1986 | Sakurai | B64D 31/04 244/220 |
| 5,228,641 A | 7/1993 | Remlaoui | |
| 5,235,808 A | 8/1993 | Taylor | |
| 5,547,130 A | 8/1996 | Davies | |
| 5,609,020 A | 3/1997 | Jackson et al. | |

(Continued)

FOREIGN PATENT DOCUMENTS

GB       2462508 A       2/2010

*Primary Examiner* — Tyler J Lee
(74) *Attorney, Agent, or Firm* — General Electric Company; Sean Weinman

(57) ABSTRACT

A thrust reverser assembly and a method of operating an aircraft during a taxi mode of operation are provided. The thrust reverser assembly includes one or more actuator assemblies configured to modulate a position of a moveable portion over a continuous range of travel between a fully stowed position and a fully deployed position, such that an air flow through said thrust reverser bleed passage is correspondingly varied. The thrust reverser assembly also includes a throttle device that includes a first, ground idle power level position and a second, forward thrust mode position. Movement into the second position may be actuated separately and differently from movement into the first position. An actuator intermediate lock may inhibit actuation of the intermediate forward thrust mode of operation until a plurality of preconditions is met.

17 Claims, 15 Drawing Sheets

(56) References Cited

U.S. PATENT DOCUMENTS

| | | | | |
|---|---|---|---|---|
| 5,996,937 A * | 12/1999 | Gonidec | | F02K 1/70 239/265.17 |
| 6,082,096 A * | 7/2000 | Vauchel | | F02K 1/70 239/265.29 |
| 6,145,301 A * | 11/2000 | Gonidec | | F02K 1/68 239/265.27 |
| 6,148,607 A * | 11/2000 | Baudu | | B64D 29/06 239/265.17 |
| 6,151,883 A | 11/2000 | Hatrick et al. | | |
| 6,151,884 A * | 11/2000 | Gonidec | | F02K 1/70 239/265.29 |
| 6,151,885 A * | 11/2000 | Metezeau | | F02K 1/605 239/265.29 |
| 6,151,886 A * | 11/2000 | Vauchel | | F02K 1/70 60/226.2 |
| 6,158,211 A * | 12/2000 | Gonidec | | F02K 1/70 60/226.2 |
| 8,528,857 B2 | 9/2013 | Hillereau et al. | | |
| 8,726,634 B2 | 5/2014 | Vauchel et al. | | |
| 9,038,367 B2 | 5/2015 | Suciu et al. | | |
| 9,043,050 B2 * | 5/2015 | Goodman | | B64D 31/04 244/221 |
| 9,074,554 B2 | 7/2015 | Caruel | | |
| 10,184,426 B2 * | 1/2019 | Schrell | | F02K 1/625 |
| 2001/0010148 A1 * | 8/2001 | Michel | | F02K 1/72 60/226.1 |
| 2002/0092948 A1 | 7/2002 | Dugan | | |
| 2005/0116096 A1 * | 6/2005 | Andre | | B64D 27/18 244/75.1 |
| 2008/0155960 A1 | 7/2008 | Hauer et al. | | |
| 2009/0151320 A1 | 6/2009 | Sternberger | | |
| 2009/0199536 A1 | 8/2009 | Bulin et al. | | |
| 2010/0269511 A1 * | 10/2010 | Vauchel | | B64C 7/02 60/771 |
| 2011/0108665 A1 * | 5/2011 | Abrial | | F02C 9/00 244/110 B |
| 2012/0023900 A1 | 2/2012 | Flin et al. | | |
| 2013/0292490 A1 | 11/2013 | Chapelain et al. | | |
| 2015/0090810 A1 * | 4/2015 | Lallement | | F02K 1/763 239/265.19 |
| 2015/0308378 A1 * | 10/2015 | Aten | | F02K 1/72 239/265.19 |
| 2015/0308379 A1 | 10/2015 | James | | |
| 2015/0354499 A1 | 12/2015 | Caruel et al. | | |
| 2016/0201601 A1 | 7/2016 | Nakhjavani et al. | | |
| 2016/0201602 A1 | 7/2016 | Nakhjavani | | |
| 2016/0305370 A1 | 10/2016 | Todorovic | | |
| 2016/0326984 A1 * | 11/2016 | Marcos | | F01D 21/14 |
| 2017/0074211 A1 | 3/2017 | Smith et al. | | |
| 2017/0198658 A1 * | 7/2017 | Higgins | | F02K 1/60 |
| 2017/0292474 A1 * | 10/2017 | Davies | | F02K 1/625 |
| 2018/0058374 A1 * | 3/2018 | Abel | | F16F 9/516 |
| 2018/0216573 A1 * | 8/2018 | Kopecek | | F02K 1/763 |

* cited by examiner

SYSTEM AND METHOD OF OPERATING A DUCTED FAN PROPULSION SYSTEM DURING AIRCRAFT TAXI

BACKGROUND

The field of the disclosure relates generally to gas turbine engines and, more particularly, to a system and method of operating a gas turbine engine system during aircraft taxi.

Aircraft powered by ducted fan propulsion systems use the ducted fan propulsion systems when taxiing between the runway and gate area of airports. When taxiing, aircraft are limited to certain ground speeds by the airport authority and may also be operationally limited to certain speeds for safe traffic management. However, at engine idle, some known ducted fan propulsion systems produce more thrust than is needed. Consequently, pilots use the aircraft braking system to reduce the ground speed of the aircraft to within the limited speeds. Such brake usage prematurely wears the brakes, necessitating additional maintenance man-hours and expense.

BRIEF DESCRIPTION

In one embodiment, a thrust reverser assembly for an aircraft is provided. The thrust reverser assembly includes a moveable portion that is moveable over a continuous range of travel between a fully stowed position and a fully deployed position, wherein movement away from the fully stowed position opens a thrust reverser bleed passage. The thrust reverser assembly also includes one or more actuator assemblies coupled to the moveable portion and operable in a forward thrust mode to modulate a position of the moveable portion along the continuous range of travel, such that an air flow through the thrust reverser bleed passage is correspondingly varied. The thrust reverser assembly further includes a throttle device including a first position associated with a ground idle power lever and a second position associated with the forward thrust mode. Movement of the throttle device into the second position is actuated separately and differently from movement of the throttle device into the first position. Additionally, the thrust reverser assembly includes an actuator lock coupled to the one or more actuator assemblies and configured to inhibit actuation of the forward thrust mode until a plurality of preconditions is met.

Optionally, the plurality of preconditions include a weight on wheels (WOW) indication and a ground speed greater than zero and less than a predetermined take-off speed. Also optionally, the throttle device is positioned to the first position by moving a handle of the throttle device through an arcuate path. The throttle device may be positioned to the second position by moving a handle of the throttle device through a non-arcuate path. Optionally, the throttle device may be positioned to the first position by moving a handle of the throttle device through an arcuate path and the throttle device may be positioned to the second position by moving the handle of the throttle device perpendicular to the arcuate path. Also optionally, the thrust reverser assembly may be embodied in at least one of a pivoting door type thrust reverser assembly and a translating cowl (transcowl) type thrust reverser assembly. The thrust reverser assembly may be configured to move to the fully stowed position when the throttle device is moved away from the first position or the second position. The one or more actuator assemblies may be powered from at least one of a hydraulic supply system, a pneumatic power source, and an electric power source. The thrust reverser may be configured to control a direction of air discharged from the thrust reverser bleed passage using at least one of a cascade assembly, an open section of the cascade assembly, a blanked off section of the cascade assembly, and a pivoting door assembly having decoupled synchronization.

In another embodiment, a method of operating an aircraft during a taxi mode of operation is provided. The method includes determining the aircraft is in the taxi mode of operation, and receiving an indication that a throttle device is in a first position associated with a ground idle power lever of one or more gas turbine engines of the aircraft. The throttle device is moveable into the first position by a first throttle device input manipulation. The method also includes receiving an indication that the throttle device is in a second position associated with an intermediate forward thrust mode of the one or more gas turbine engines, wherein the throttle device is moveable into the second position by a second throttle device input manipulation. The method further includes autonomously modulating, by an electronic control system, in the intermediate forward thrust mode, a thrust reverser assembly of the one or more gas turbine engines to one of plurality of intermediate positions between a fully deployed position and a fully stowed position to control a ground speed of the aircraft.

Optionally, the method includes receiving a weight on wheels (WOW) signal and/or a ground speed (GRND SPD) signal. Also optionally, the method includes determining that the received ground speed (GRND SPD) signal is greater than approximately zero forward speed and less than a predetermined threshold speed range determined based on a take-off speed of the aircraft. The method may include receiving an engine power level indication that is less than a predetermined range. Optionally, the method may include receiving the indication that the throttle device is in the second position from the throttle device having the second throttle device input manipulation different from the first throttle device input manipulation. Also optionally, the method includes operating an actuator assembly of the thrust reverser assembly to position a moveable portion of the thrust reverser assembly in a plurality of intermediate positions between the fully stowed position and the fully deployed position. The method may also include simultaneously varying a first amount of air exhausted from a fan nozzle outlet and a second amount of air bled through a bleed passage.

In yet another embodiment, a thrust reverser assembly is provided. The thrust reverser assembly includes a fan duct configured to channel a flow of air from an inlet to a nozzle. The fan duct includes a bleed passage configured to channel a portion of the flow of air to ambient. The thrust reverser assembly also includes an actuator assembly selectively operable to continuously vary an amount of the portion of the flow of air channeled through the bleed passage, and an actuator lock operatively coupled to the actuator assembly. The actuator lock is configured to selectively prevent the actuator assembly from modulating between a fully stowed position and a fully deployed position.

Optionally, the thrust reverser assembly includes an actuator intermediate lock coupled to the actuator assembly and configured to inhibit actuation of an intermediate forward thrust mode of operation until a plurality of preconditions are met. Also optionally, the thrust reverser assembly includes a controller configured to receive aircraft parameters including at least one of weight on wheels (WOW), ground speed (GRND SPD), altitude (ALT), flap position (FLAPS), and thrust reverser position (TRP). Also optionally, the controller is further configured to receive at least one of a throttle position and engine sensor measurements including at least one of fan rotor speed (N1), core rotor speed (N2), and compressor discharge static pressure (PS3). The controller may be embodied in a plurality of separate stand-alone computing devices. Optionally, the controller is further configured to receive a nacelle bleed auto/inhibit switch signal from a cockpit override system and may be configured to stow the thrust reverser assembly based on the nacelle bleed auto/inhibit switch signal. Optionally, the thrust reverser assembly may include a synchronizing system configured to control relative positions of actuators of the actuator assembly, the actuator assembly may lockable between the fully stowed position and any of a plurality of intermediate positions using an actuator lock on the synchronizing system, and the actuator lock may be configured to prevent the actuator assembly from moving from each intermediate position to the fully deployed position.

BRIEF DESCRIPTION OF THE DRAWINGS

FIG. 1 is a perspective view of an aircraft.

FIG. 2 is a side view of an exemplary ducted propulsion assembly, such as, the gas turbine engine shown in FIG. 1 and that includes an exemplary thrust reverser assembly.

FIG. 3 is a side elevation view of a pivoting door style thrust reverser assembly that may be used with the ducted propulsion assembly shown in FIGS. 1 and 2 in a stowed position.

FIG. 4 is a side elevation view of the thrust reverser assembly of FIG. 3 in a fully deployed position.

FIG. 5 is a side elevation view of a pivoting door style thrust reverser assembly of FIG. 3 in one of a plurality of selectable intermediate positions.

FIG. 6 is a partial sectional side view of a blocker-doorless style translating cowl ("transcowl") thrust reverser assembly in a stowed position that may be used with the ducted propulsion assembly shown in FIGS. 1 and 2.

FIG. 7 is a partial sectional side view of the blocker-doorless style thrust reverser assembly of FIG. 6 in a fully deployed position.

FIG. 8 is a partial sectional side view of the blocker-doorless style thrust reverser assembly of FIG. 6 in an intermediate position.

FIG. 9 is a perspective view of the ducted propulsion assembly with the transcowl of FIG. 6 in a stowed position.

FIG. 10 is a perspective view of the ducted propulsion assembly with the transcowl of FIG. 6 in a fully deployed position.

FIG. 11 is a perspective view of the ducted propulsion assembly the transcowl of FIG. 6 in one of the plurality of selectable intermediate positions.

FIG. 12 is an axial view of the ducted propulsion assembly with the transcowl of FIG. 6 in one of the plurality of selectable intermediate positions.

FIG. 13 is a graph of thrust versus throttle lever for a throttle device that may be used with the ducted propulsion assembly shown in FIG. 2.

FIG. 14 is a perspective view and a schematic view of the throttle device described in the graph of FIG. 13.

FIG. 15 is a schematic view of another embodiment of a thrust reverser control system that may be used with the ducted propulsion assembly shown in FIG. 2.

FIG. 16 schematic view of another embodiment of a thrust reverser control system that may be used with the ducted propulsion assembly shown in FIG. 2.

FIG. 17 is a flow diagram of a method of operating an aircraft during a taxi mode of operation.

Figure 1:
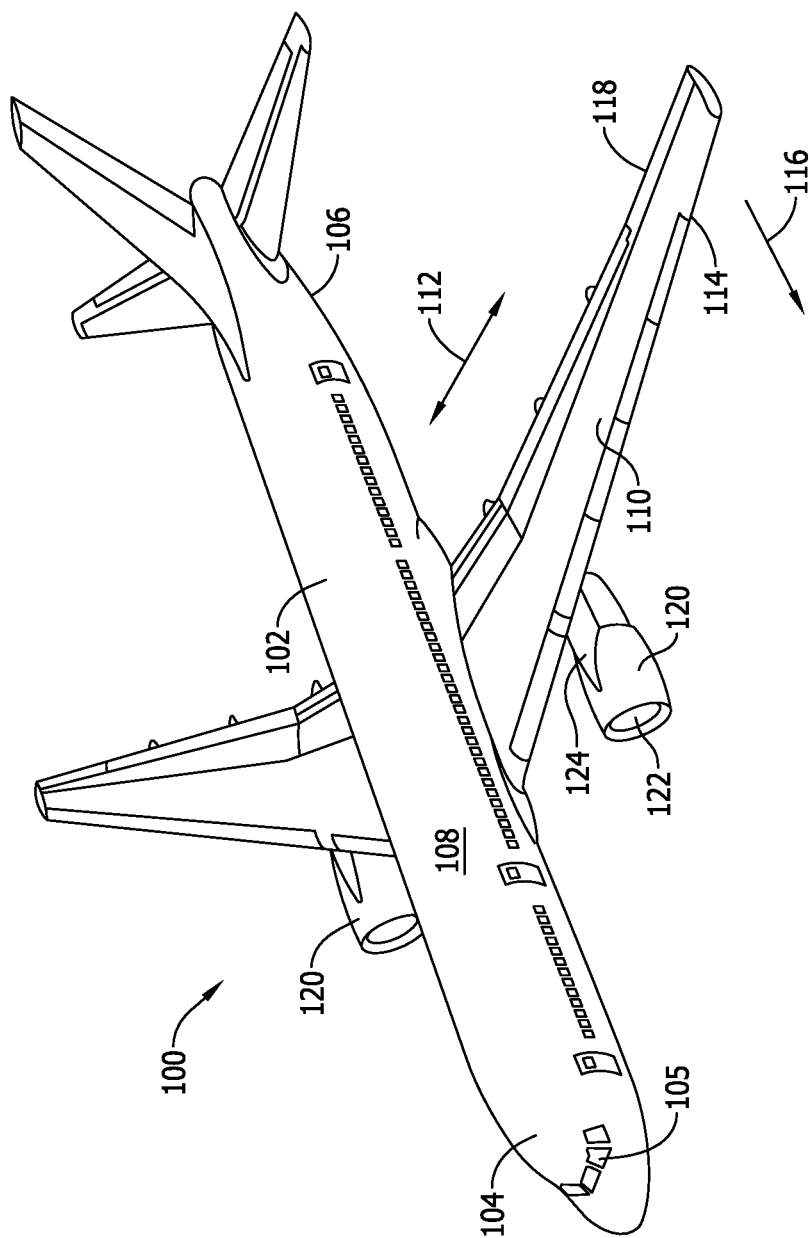
FIGS. 1-17 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of a thrust reverser system and method of operating the thrust reverser system are described herein. A thrust reverser system installed on an aircraft propulsion system is typically operated in either of two discrete operating positions, fully stowed or fully deployed. Described herein is a thrust reverser system that autonomously modulates the actuators of the thrust reverser system across intermediate positions depending on operating mode. During aircraft taxi, locks associated with the transcowl are commanded to unlatch and the thrust reverser actuators are commanded to an intermediate stroke position, thus exposing open sections of the exhaust duct to ambient. The intermediate position(s) allows a percentage of compressed airflow to bleed overboard for an extended duration of time, thus reducing forward thrust that would otherwise be generated by exhausting the airflow out of the nozzle. The reduction of ground idle thrust is desirable to maintain aircraft taxi speed below established limits and reduce brake wear and/or brake temperature. When certain preconditions are met the thrust reverser can autonomously begin modulating the forward thrust of the engines while the engines are at an idle power level by spoiling some of the fan discharge air through the intermediately positioned thrust reverser opening in the fan duct. In various embodiments, the preconditions include a weight-on-wheels indication, and a ground speed greater than zero and less than a predetermined take-off speed. Operating at reduced thrust using a modulated partially deployed thrust reverser system is compatible with pivoting door style thrust reverser systems, translating cowl (transcowl) style thrust reverser systems, and blocker-doorless style thrust reverser systems. Autonomous operation permits reduced pilot load during critical operational periods. For example, after setting a desired ground speed or after a ground speed setting is determined, the pilot does not need to adjust the operation of the thrust reverser system manually. Based on aircraft and engine sensors and other data, a position of the fan duct bleed air passage is automatically maintained. In cases where autonomous operation of the thrust reverser system is not desired a cockpit override system is available to return the operation of the thrust reverser system to a manual mode. To modulate the net forward thrust of the engines, the pivoting door or transcowl is positionable in an infinite number of positions between stowed and fully deployed. In some embodiments of a blocker door style thrust reverser system, the blocker doors move with the transcowl over the entire span of travel of the transcowl. In other embodiments, the movement of the blocker doors is independent of the movement of the transcowl.

The described method of operation enables the aircraft engine to produce less thrust at forward ground idle power settings while maintaining sufficient pressure for bleed offtakes from the engine for systems on board the aircraft. The operation described herein also permits aircraft taxi with all engines running, which (1) reduces exhaust gas temperature (EGT) overshoot on a cold engine that was shutdown during taxi out to the runway (2) and reduces exhaust jet velocities and blast damage radius behind the aircraft. The described operation also reduces the need for brake operation during taxi which reduces brake temperature at the start of takeoff and is optimal for total energy-absorbing capability in the case of a rejected takeoff. In the example embodiments, the existing thrust reverser hardware actuation system can be utilized to reduce forward ground idle thrust.

The following description refers to the accompanying drawings, in which, in the absence of a contrary representation, the same numbers in different drawings represent similar elements.

FIG. 1 is a perspective view of an aircraft 100. In the example embodiment, aircraft 100 includes a fuselage 102 that includes a nose 104, a cockpit 105 positioned within nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one gas turbine engine 120 configured to drive a bladed rotatable member 122 or fan to generate thrust. At least one gas turbine engine 120 is connected to an engine pylon 124, which may connect the at least one gas turbine engine 120 to aircraft 100. Engine pylon 124, for example, may couple at least one gas turbine engine 120 to at least one of wing 110 and fuselage 102, for example, in a pusher configuration (not shown) proximate tail 106.

Figure 2:
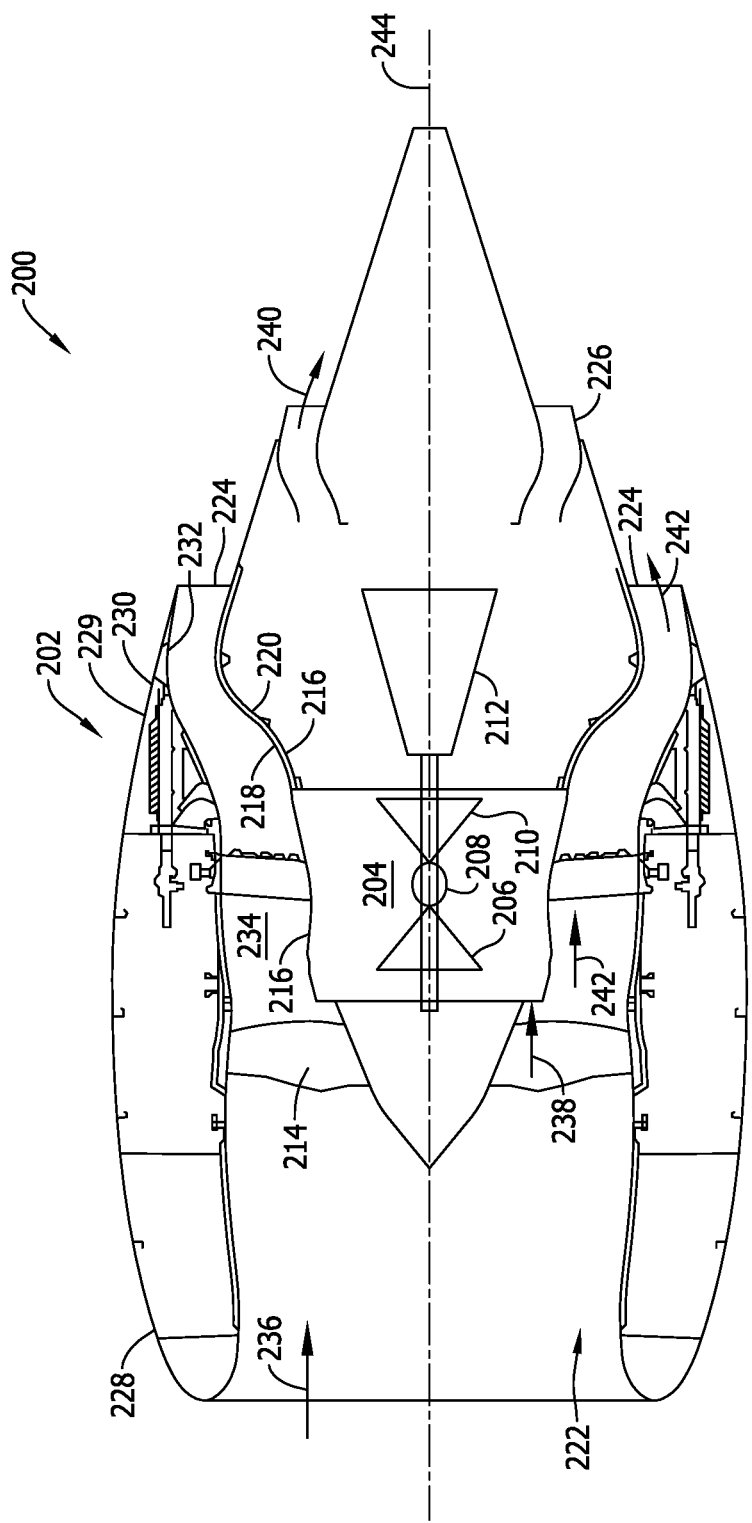

FIG. 2 is a side view of an exemplary ducted propulsion assembly 200 that may be used as gas turbine engine 120 (shown in FIG. 1). Ducted propulsion assembly 200 includes an exemplary thrust reverser assembly 202. In one embodiment, thrust reverser assembly 202 is embodied as a translating cowl ("transcowl") thrust reverser and will be discussed in more detail below. In other embodiments, thrust reverser assembly 202 is embodied as a pivoting door type thrust reverser. In other embodiments, thrust reverser assembly 202 may be embodied as other types of thrust reversers. Moreover, in the exemplary embodiment, ducted propulsion assembly 200 includes an engine core 204 that includes a high-pressure compressor 206, a combustor 208, and a high-pressure turbine 210. Ducted propulsion assembly 200 also includes a low-pressure turbine 212 that is disposed axially downstream from engine core 204 along a longitudinal axis 244. A fan assembly 214 and in some embodiments, a low pressure compressor or booster are positioned axially upstream from engine core 204. In the exemplary embodiment, ducted propulsion assembly 200 includes an annular core cowl 216 that extends around engine core 204 and includes a radially outer surface 218 and a radially inner surface 220. Ducted propulsion assembly 200 also includes an inlet opening 222, a fan nozzle outlet 224, and a core nozzle outlet 226.

Ducted propulsion assembly 200 further includes a fan nacelle 228 that surrounds fan assembly 214 and is spaced radially outward from core cowl 216. Nacelle 228 includes an annular aft cowl. In the exemplary embodiment, annular aft cowl is a translating cowl or transcowl 229. Transcowl 229 has a radially outer surface 230 and a radially inner surface 232. A fan duct 234 is defined between radially outer surface 218 of core cowl 216 and radially inner surface 232 of nacelle 228.

During operation, inlet airflow 236 enters inlet opening 222, flows through fan assembly 214, and is discharged downstream. A core airflow portion 238 of inlet airflow 236 is channeled through engine core 204, compressed, mixed with fuel, and ignited for generating combustion gases 240 which are discharged from engine core 204 through core nozzle outlet 226. A fan duct airflow portion 242 of inlet airflow 236 is channeled downstream through fan duct 234 which is discharged from fan duct 234 through fan nozzle outlet 224.

Ducted propulsion assembly 200 is depicted in the figures by way of example only, in other exemplary embodiments, ducted propulsion assembly 200 may have any other suitable configuration including for example, a turboprop engine, a military purpose engine, and a marine or land-based aero-derivative engine.

Figure 3:
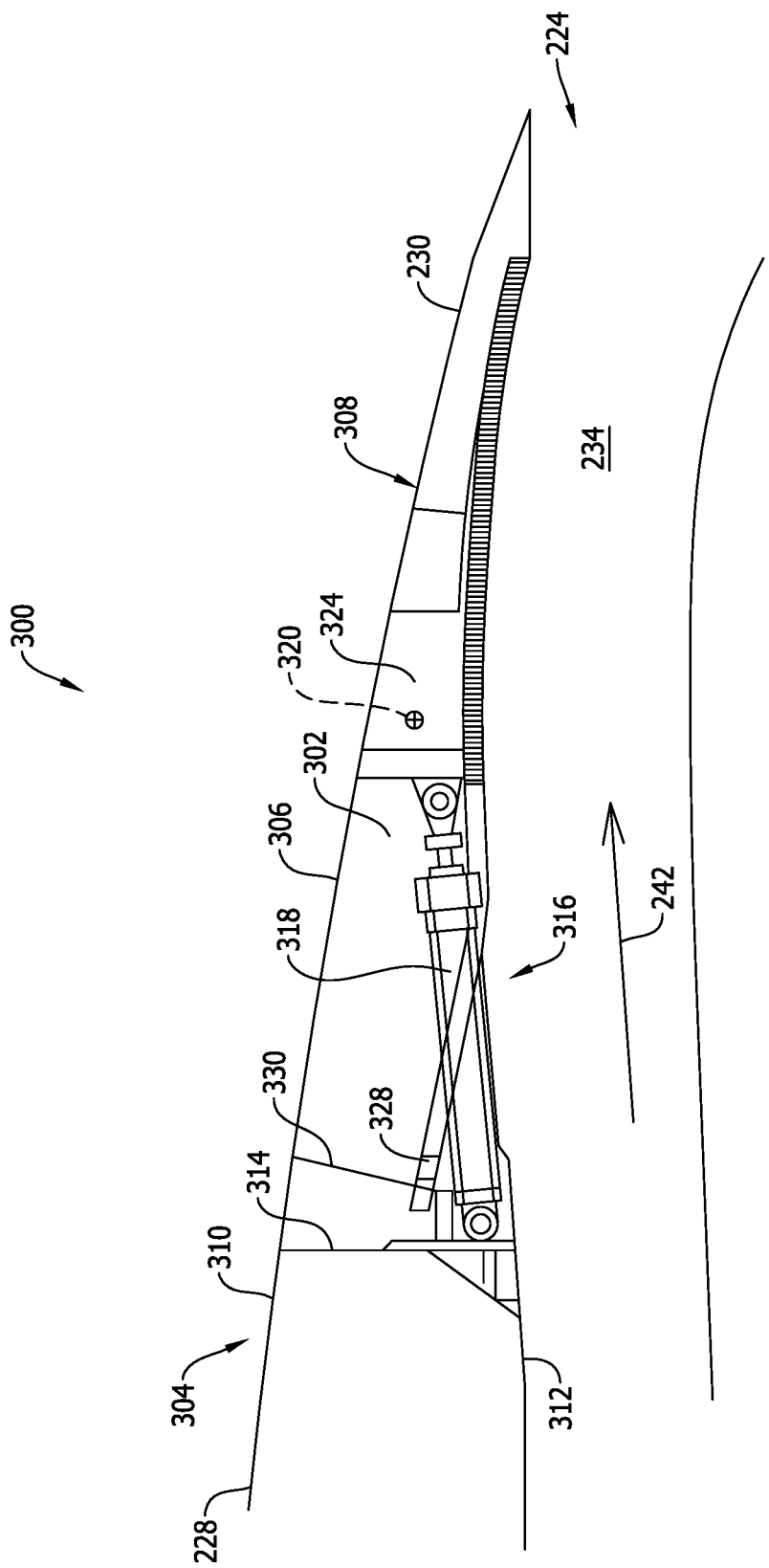
Figure 4:
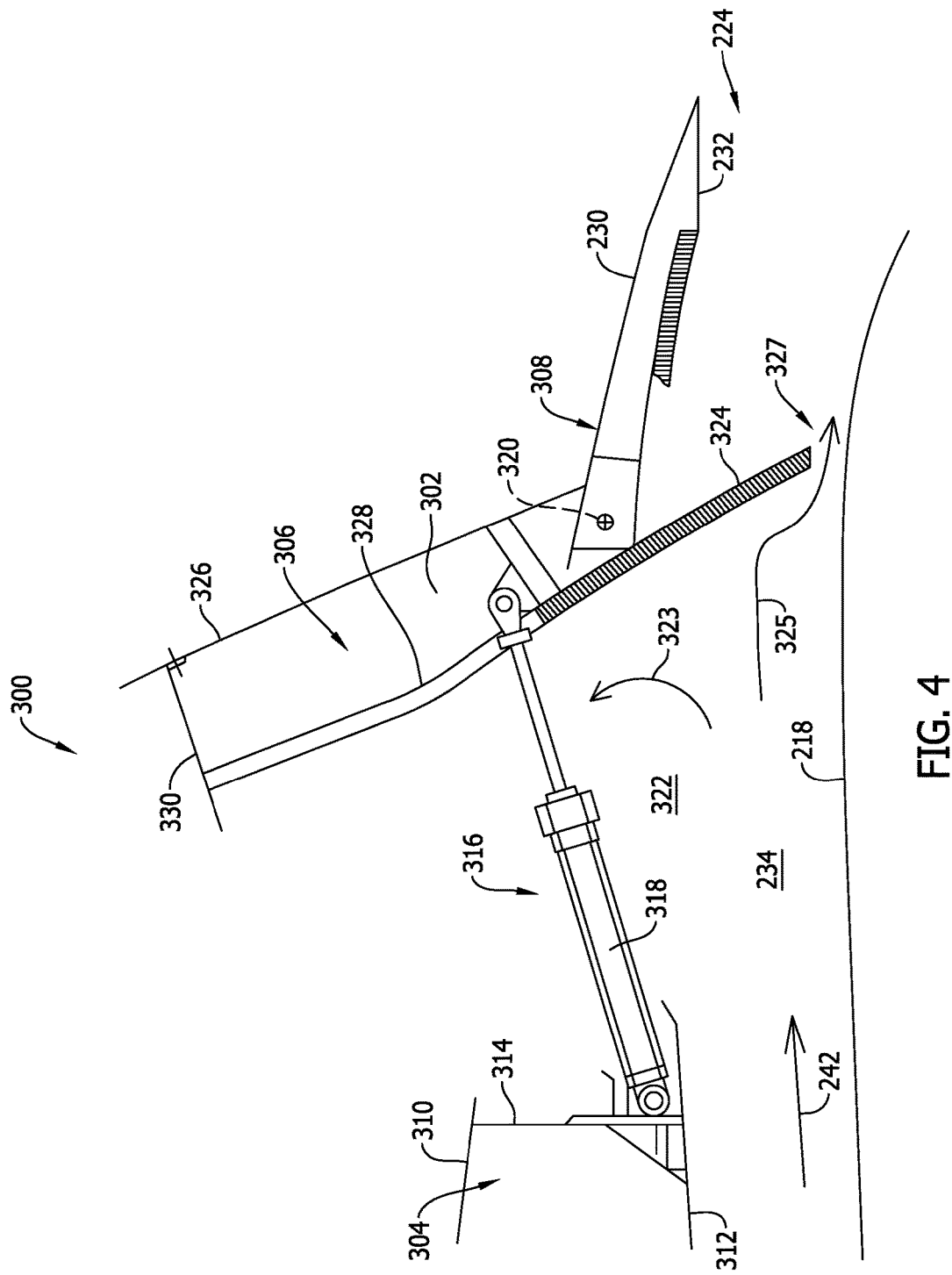
Figure 5:
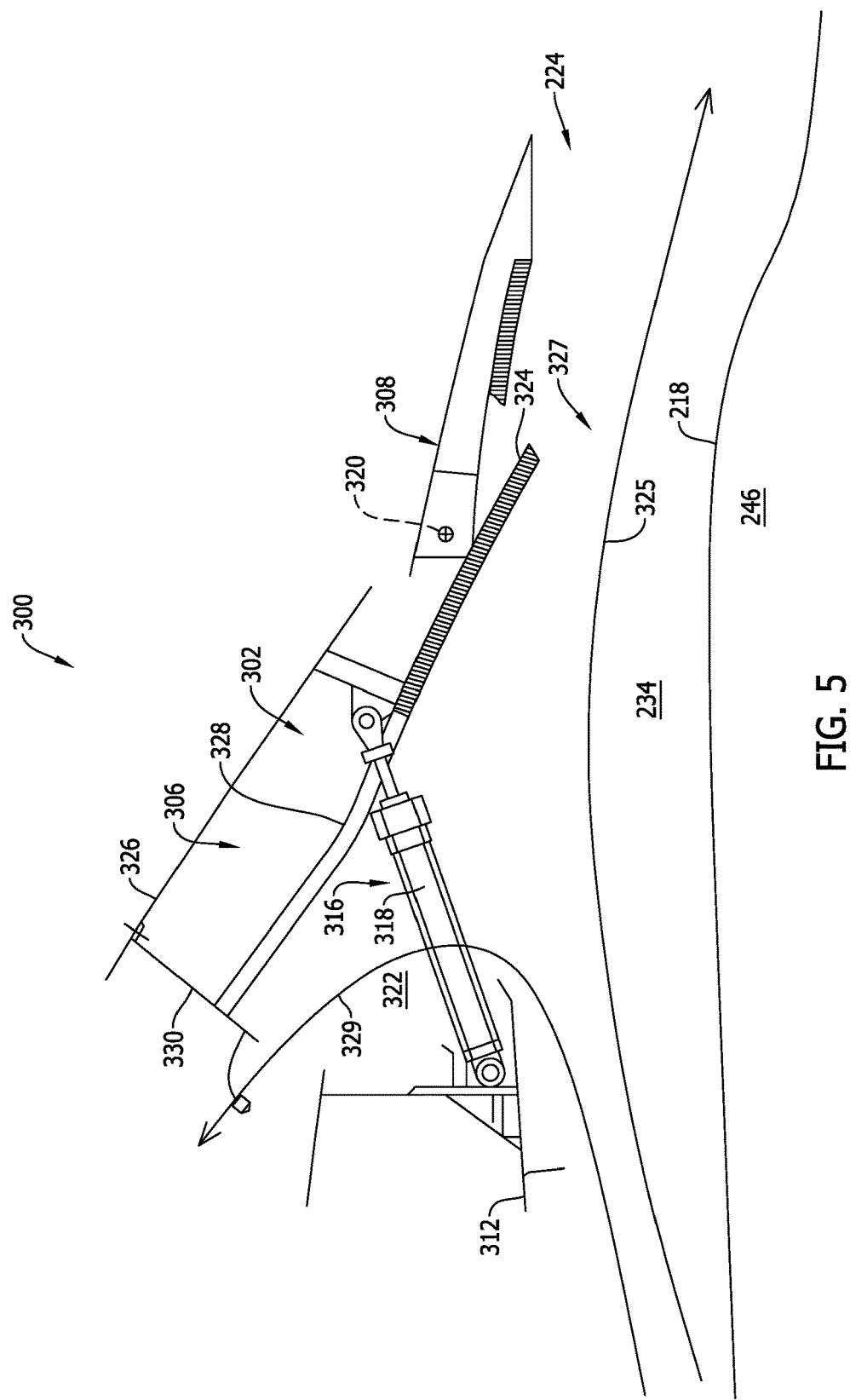

FIG. 3 is a side elevation view of a pivoting door style thrust reverser assembly 300 that may be used with ducted propulsion assembly 200 (shown in FIGS. 1 and 2) in a stowed position. FIG. 4 is a side elevation view of thrust reverser assembly 300 in a fully deployed position. FIG. 5 is a side elevation view of thrust reverser assembly 300 in one of a plurality of selectable intermediate positions. Thrust reverser assembly 300 is used during aircraft taxi to reduce forward thrust to below idle thrust levels. In the example embodiment, thrust reverser assembly 300 includes a movable portion 306 selectable movable between a stowed position, shown in FIG. 3, and a fully open position, shown in FIG. 4. Moveable portion 306 is maintainable in a plurality of intermediate positions between the stowed position and the fully open position.

In one embodiment, thrust reverser assembly 300 includes three main portions, i.e. a stationary forward cowl 304 positioned in a relatively forward section of thrust reverser assembly 300, moveable portion 306 downstream from stationary forward cowl 304, and a fixed downstream ferrule 308. Stationary forward cowl 304 includes an external panel 310 ensuring aerodynamic continuity of the external surface of nacelle 228, and an internal panel 312 forming an outer boundary of fan duct 234. External panel 310 and internal panel 312 are connected through a front frame 314 which also ensures support of an actuator assembly 316 for controlling moveable portion 306. In the example embodiment, actuator assembly 316 includes an actuator 318. Although only one actuator 318 is illustrated, thrust reverser assembly 300 may include a plurality of actuators 318. In some embodiments, some of the plurality of actuators 318 may be ganged together to operate simultaneously. In other embodiments, the plurality of actuators 318 may operate independently of each other.

In the exemplary embodiment, moveable portion 306 includes one or more doors 302, each of which is pivotally mounted about an axis of rotation 320 substantially perpendicular to longitudinal axis 244 (shown in FIG. 2). For example, a plurality of doors 302 may be spaced circumferentially around fan duct 234.

Consequently, under the action of actuator 318, each door 302 may switch between the stowed or closed position in which door 302 ensures the structural continuity between stationary forward cowl 304 and downstream ferrule 308, such that substantially no bleed air is channeled from fan duct 234, and the open position in which door 302 clears a bleed passage 322 between stationary forward cowl and downstream ferrule 308, such that a thrust reversing portion 323 of air flowing through fan duct 234 is channeled through bleed passage 322 to provide reverse thrust.

As illustrated in FIG. 4, during pivoting, a downstream portion 324 of door 302 at least partially blocks fan duct 234 thereby forcing thrust reversing portion 323 of fan duct airflow portion 242 flowing through fan duct 234 through bleed passage 322. As door 302 opens a diminishing amount of a gap airflow portion 325 of air flowing through fan duct 234 is directed to pass through a gap 327 between downstream portion 324 of door 302 and radially outer surface 218 of core cowl 216, and to fan nozzle outlet 224. In some embodiments, a small amount of gap airflow portion 325 is allowed to escape through gap 327 for, for example, cooling or pressure regulation purposes. In other embodiments, gap 327 is sealed at the end of travel of door 302 and gap airflow portion 325 is completely blocked.

Door 302 includes an external panel 326 which, in the stowed or direct thrust mode, may be aligned with stationary forward cowl 304 and ensures outer aerodynamic continuity with an external surface of downstream ferrule 308. Door 302 also includes an internal panel 328 and an upstream frame 330 connecting external panel 326 and internal panel 328.

In FIG. 5, door 302 is shown in one of an infinite plurality of selectable intermediate positions as door 302 is continuously adjusted between the fully stowed position shown in FIG. 3 and the fully deployed position shown in FIG. 4 via operation of actuator assembly 316. In any of the plurality of intermediate positions, a selectable amount of a gap airflow portion 325 of air flowing through fan duct 234 is directed to pass through a gap 327 between downstream portion 324 of door 302 and radially outer surface 218 of core cowl 216, and to fan nozzle outlet 224. A fan duct bleed airflow portion 329 of air flowing through fan duct 234 is directed through bleed passage 322 in selectively variable amounts to vary the amount of forward thrust generated by ducted propulsion assembly 200. Accordingly, thrust reverser assembly 300 is capable of providing variable amounts of thrust in ducted propulsion assembly 200, including amounts less than idle speed thrust. As described above, pivoting door style thrust reverser assembly 300 uses intermediate pivoting door positions to create passages in the fan duct 234 to allow air to flow/leak overboard (spoil fan nozzle thrust). Thus, when the aircraft is, for example, taxiing between the runway and the gate area, a position of moveable portion 306 is modulated among various intermediate positions to modulate forward thrust of ducted propulsion assembly 200.

In some embodiments, pivoting doors 302 are autonomously deployed and/or modulated by a suitable controller, such as, but not limited to a thrust reverser control system 1500 (shown in FIG. 15), when taxing conditions are satisfied, such that no manual pilot intervention is needed. A cockpit override system exists to prevent partial deployment under undesirable conditions (for example, on foreign object debris (FOD) prone taxiways).

In certain embodiments, the direction of discharged air circumferentially around the engine is managed by decoupling the synchronization between pivoting doors 302 or using "blanked off sections" in bleed passage 322 to block fan duct bleed airflow portion 329 at predetermined locations. In some embodiments, it may be desirable to discharge the air in an upward direction to avoid blowing the air onto the ground, for example, for a wing mounted installation, which may stir up particles or debris, which could be ingested into ducted propulsion assembly 200. In other embodiments, discharging the air downward, away from the wing, may be desirable. Decoupling the synchronization between pivoting doors 302 and/or using the blanked off sections (i.e., blanks that do not permit airflow therethrough) permits non-uniform discharge of fan duct bleed airflow portion 329 about a circumference of ducted propulsion assembly 200.

Figure 6:
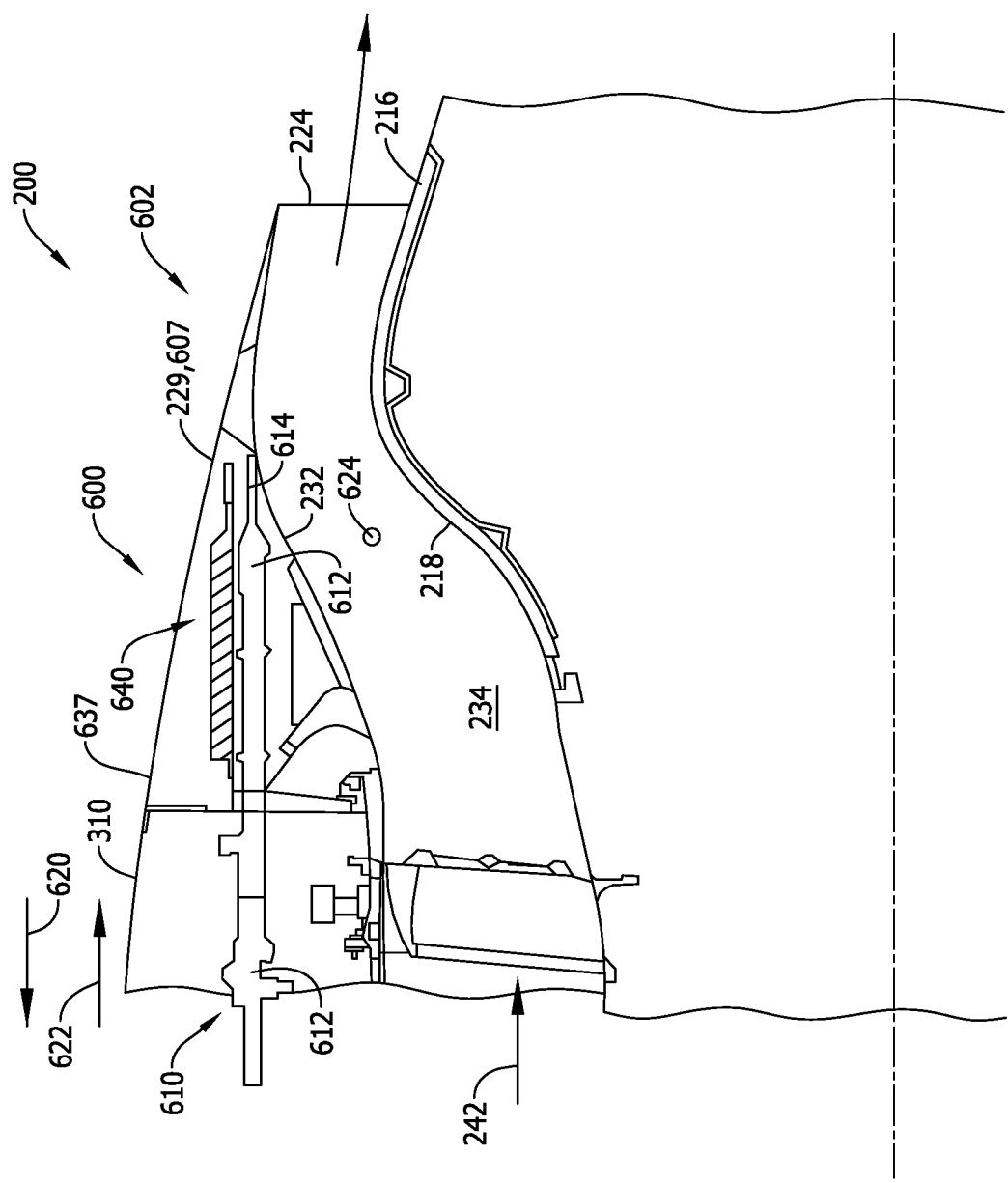
Figure 7:
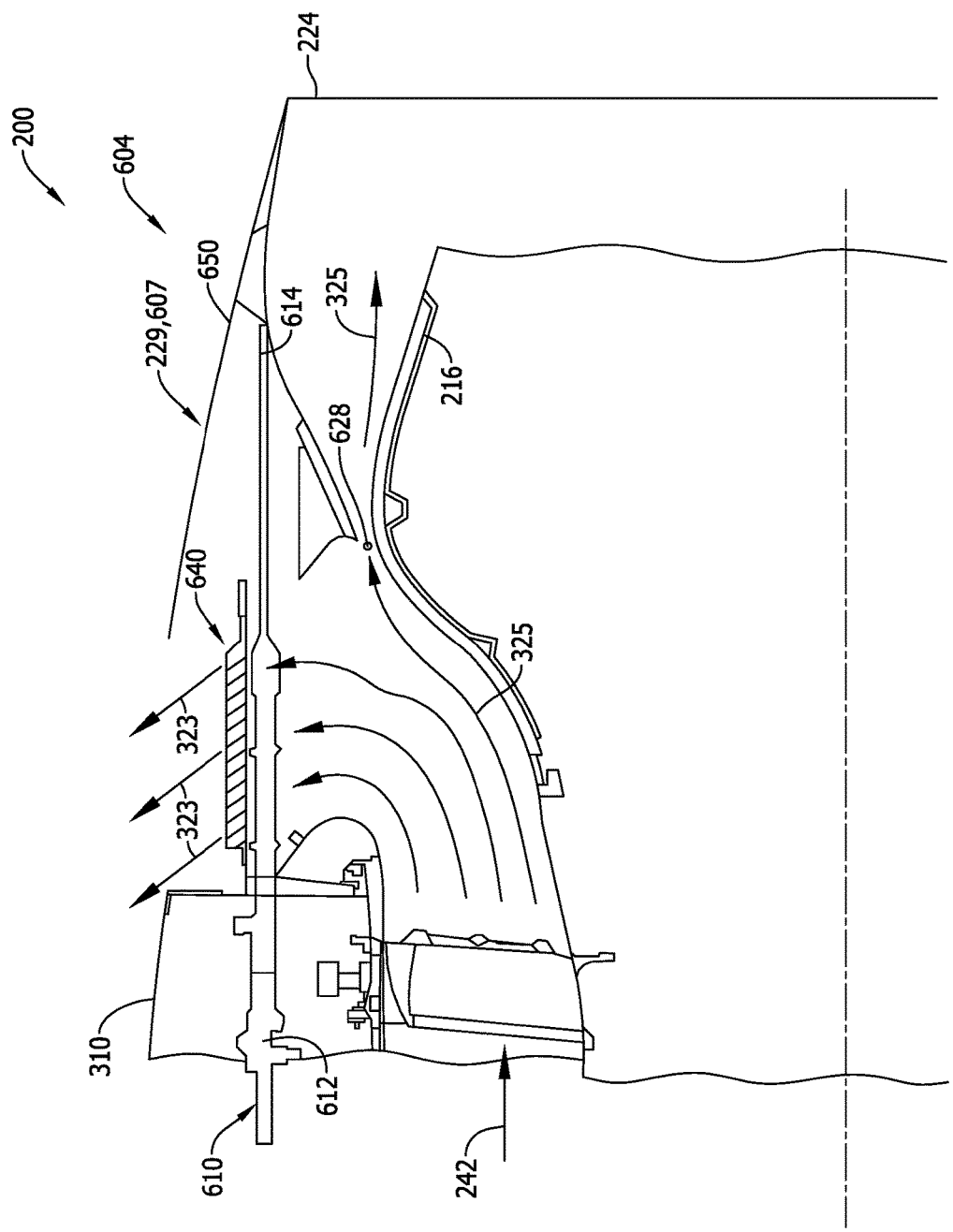
Figure 8:
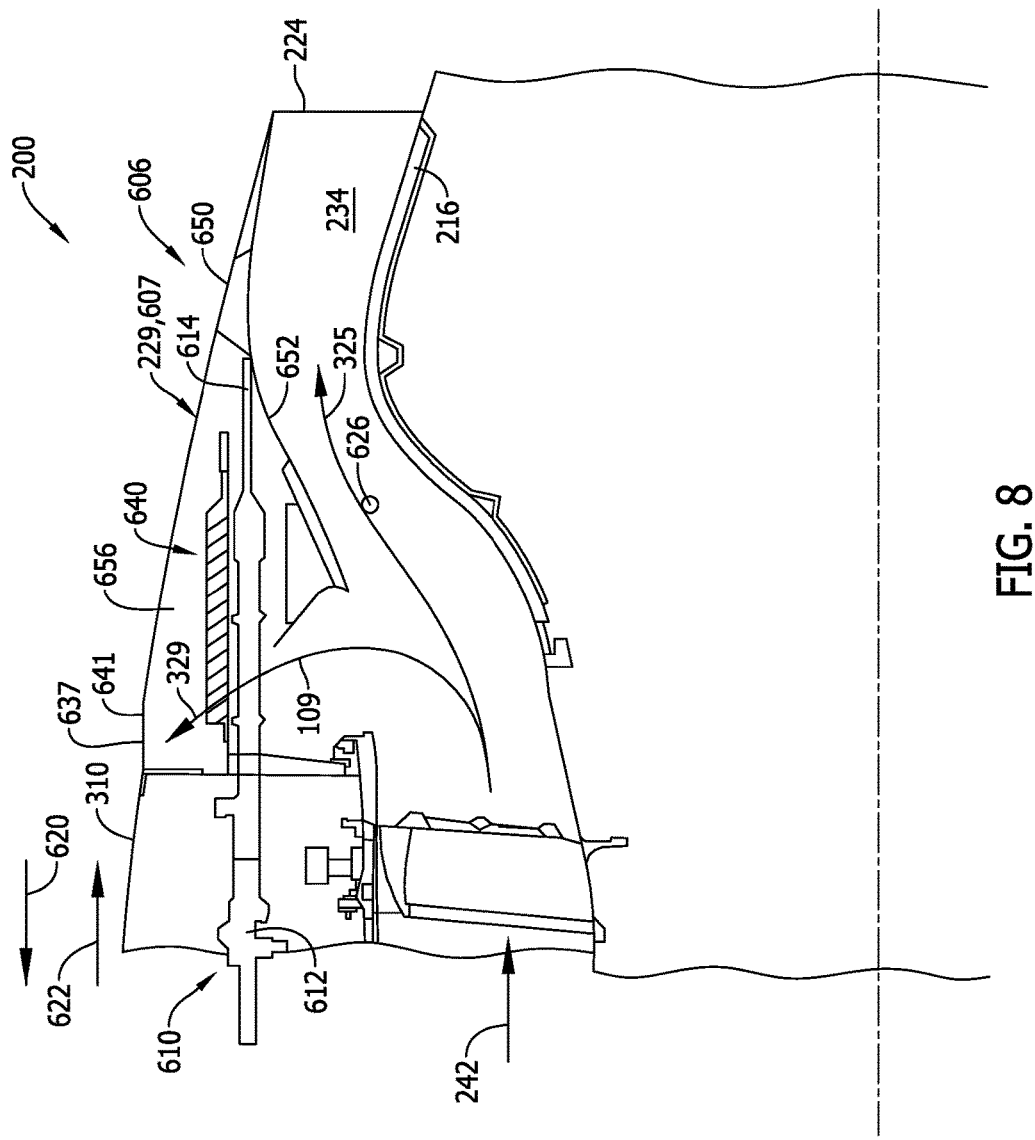

FIG. 6 is a partial sectional side view of a blocker-doorless style translating cowl ("transcowl") thrust reverser assembly 600 that may be used with ducted propulsion assembly 200 (shown in FIGS. 1 and 2) in a stowed position 602. FIG. 7 is a partial sectional side view of blocker-doorless style thrust reverser assembly 600 in a fully deployed position 604. FIG. 8 is a partial sectional side view of blocker-doorless style thrust reverser assembly 600 in an intermediate position 606. In the exemplary embodiment, thrust reverser assembly 600 includes moveable portion 607 defined by transcowl 229 which defines a portion of nacelle 228. In the exemplary embodiment, transcowl 229 is movably coupled to external panel 310. In the exemplary embodiment, transcowl 229 includes a plurality of separately moveable transcowls 229 disposed circumferentially about fan duct 234. In alternative embodiments, transcowl 229 is an integral structure.

In the exemplary embodiment, thrust reverser assembly 600 also includes an actuator assembly 610 that is coupled to transcowl 229 to selectively translate transcowl 229 in a generally axial direction relative to external panel 310 to vary the amount of air flowing through fan duct 234 and thrust reverser assembly 600. In the exemplary embodiment, actuator assembly 610 is positioned within a portion of the area defined by nacelle 228. Actuator assembly 610 includes a plurality of circumferentially-spaced actuators or motors 612, and a plurality of extending rods 614. For example, the rods may be, but are not limited to, ball screws. In the exemplary embodiment, each rod 614 is coupled to a respective motor 612 and to transcowl 229 such that energizing motors 612 causes transcowl 229 to be translated in either a forward direction 620 or an aft direction 622 depending on the rotation produced by the energization of motors 612. In the exemplary embodiment, actuator assembly 610 may be, but is not limited to, electrically, pneumatically, or hydraulically powered to move transcowl 229 from stowed position 602, in which transcowl 229 is fully retracted against external panel 310, to intermediate position 606, wherein transcowl 229 is translated to a position a distance aftward and away from external panel 310. In the stowed position 602, fan duct 234 has a first fan duct area 624 defined between radially outer surface 218 of core cowl 216 and transcowl 229. In intermediate position 606, fan duct 234 has a second fan duct area 626 defined between radially outer surface 218 of core cowl 216 and transcowl 229. In the exemplary embodiment, second fan duct area 626 is less than first fan duct area 624. Operation of actuator assembly 610 also enables transcowl 229 to translate from intermediate position 606 to either fully deployed position 604 or to be returned to stowed position 602 depending on the energization of motors 612. In fully deployed position 604, transcowl 229 is fully extended from external panel 310. In fully deployed position 604, fan duct 234 has a third fan duct area 628 defined between radially outer surface 218 of core cowl 216 and transcowl 229. In the exemplary embodiment, third fan duct area 628 is less than first and second duct areas 624 and 626. Dedicated locks incorporated to ensure three lines of defense against inadvertent deployment beyond the intermediate position.

In the exemplary embodiment, thrust reverser assembly 600 also includes a cascade box 640 including a plurality of cascade turning vanes that is positioned between, or at the juncture of transcowl 229 and external panel 310. As such, cascade box 640 is selectively positioned in flow communication with thrust reversing portion 323 of fan duct airflow portion 242 channeled through fan duct 234 in fully deployed position 604, while maintaining a predetermined fan area match.

In the exemplary embodiment, transcowl 229 includes a radially outer panel 650 and a radially inner panel 652 that is coupled to radially outer panel 650. In the exemplary embodiment, a cavity 656 is defined between outer and inner panels 650 and 652, respectively. Cavity 656 is sized to house cascade box 640 therein when transcowl 229 is in stowed position 602.

During operation of aircraft 100 during taxi on the ground, a pilot/operator may selectively position moveable portion 607, that is, transcowl 229, in stowed position 602, fully deployed position 604, or any of an infinite plurality of selectable intermediate positions 606. For example, the operator may selectively position transcowl 229 in stowed position 602 while the aircraft is operating in a run-up to takeoff mode. In stowed position 602, transcowl 229 is fully retracted against external panel 310 such that substantially all of fan duct airflow portion 242 discharged from fan assembly 214 is channeled through fan duct 234 and exits fan duct 234 at fan nozzle outlet 224.

When the aircraft is taxiing between the runway and the gate area, the pilot/operator may optionally select intermediate position 606 during which transcowl 229 is controlled by axially translating transcowl 229 to modulate forward thrust of ducted propulsion assembly 200. Alternatively, intermediate position 606 may be selected automatically when all interlocks and preconditions have been satisfied. Transcowl 229 may be modulated to maintain a selectable ground speed or other parameter. Although transcowl 229 is partially extended from external panel 310 and fan duct area is reduced from first fan duct area 624 to second fan duct area 626, fan duct bleed airflow portion 329 of fan duct airflow portion 242 is channeled through cascade box 640 and exhausted to ambient without providing forward thrust, while maintaining overall area match.

When the aircraft has landed, and an operator desires to effect reverse thrust, an operator may choose to move transcowl 229 from either the stowed position 602 or intermediate position 606, respectively, to fully deployed position 604. Specifically, in the exemplary embodiment, second fan duct area 626 is reduced to third fan duct area 628, i.e. approximately zero area, to restrict fan flow. In fully deployed position 604, third fan duct area 628 prevents essentially all of fan duct bleed airflow portion 329 of fan duct airflow portion 242 from being channeled through fan duct 234 and therefore channels substantially all of fan duct bleed airflow portion 329 of fan duct airflow portion 242 through cascade box 640 facilitating effecting reverse thrust to slow the aircraft.

Figure 9:
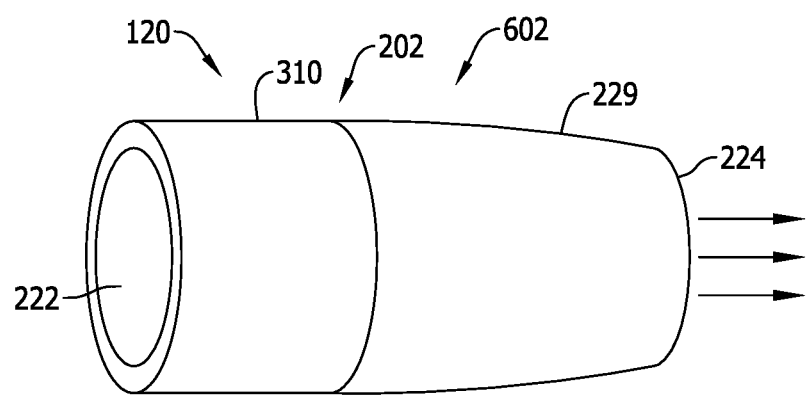
Figure 10:
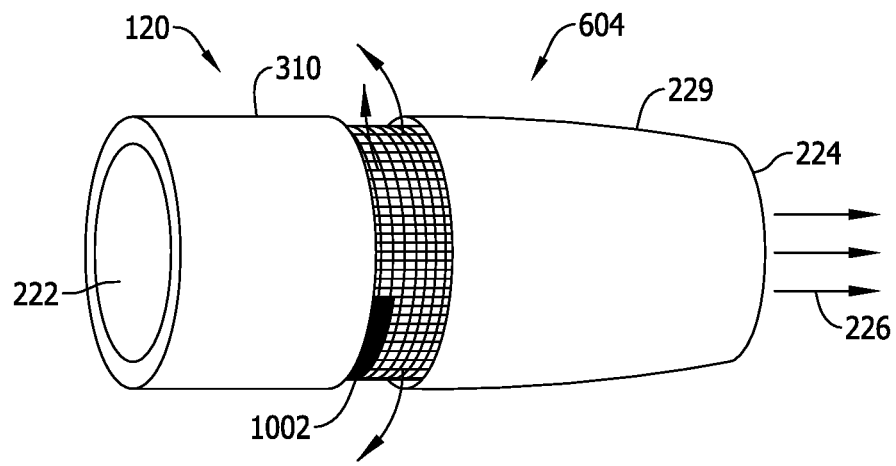
Figure 11:
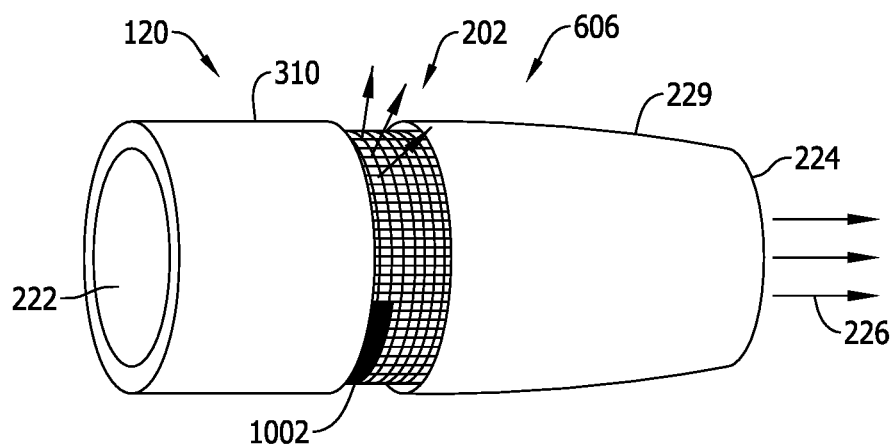
Figure 12:
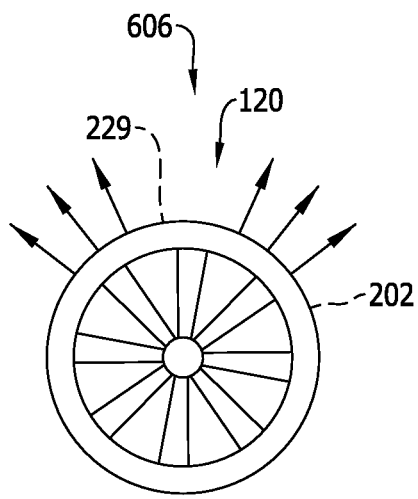

FIG. 9 is a perspective view of ducted propulsion assembly 200 with transcowl 229 in stowed position 602. FIG. 10 is a perspective view of ducted propulsion assembly 200 with transcowl 229 in fully deployed position 604. FIG. 11 is a perspective view of ducted propulsion assembly 200 with transcowl 229 in one of the plurality of selectable intermediate positions 606. FIG. 12 is an axial view of ducted propulsion assembly 200 with transcowl 229 in one of the plurality of selectable intermediate positions 606. The air discharged from thrust reverser assembly 202 is directed vertically upward away from the runway to prevent reingestion of exhausted air. System hardware used to control the direction of discharged air includes cascade assemblies such as, but not limited to, cascade box 640 described above. Such cascade assemblies may include suitable open sections (not shown) and/or blanked-off sections 1002. System hardware used to control the direction of discharged air may also include decoupling the synchronization between pivoting doors (when used), as described above with respect to pivoting doors 302. The cockpit override system, used in conjunction with the redundant intermediate position locks, prevents partial deployment under undesirable conditions (FOD prone taxiways). FIGS. 9-12 illustrate a method of operating ducted propulsion assembly 200 during aircraft taxi to reduce forward thrust. In stowed position 602, no air is exhausted through thrust reverser assembly 202. In fully deployed position 604, air is exhausted only through thrust reverser assembly 202 and essentially none is exhausted through fan nozzle outlet 224, although combustion gases still exit through core nozzle outlet 226. In intermediate position 606, a variable amount of air exhausts through thrust reverser assembly 202 to vary the amount of forward thrust commanded to provide a controlled speed of aircraft 100 that is less than the ground idle speed.

In the example embodiment, intermediate positions of translating transcowl 229 are used to create a passage through fan duct 234 to allow air to flow/leak overboard (spoil fan nozzle thrust). Transcowl 229 is autonomously deployed by control sub-systems (described below) when taxing conditions are satisfied, no manual pilot intervention is needed. The cockpit override system, used in conjunction with the redundant intermediate position locks, prevents partial deployment under undesirable conditions.

Figure 13:
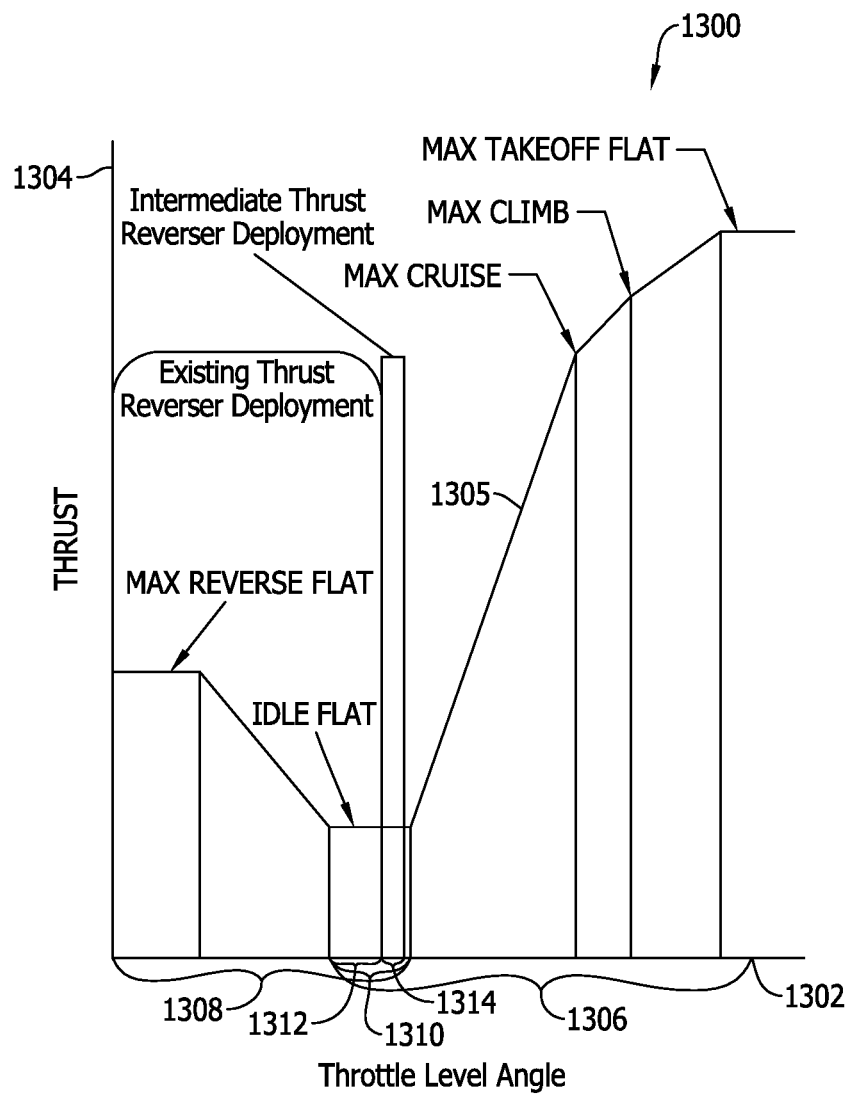
Figure 14:
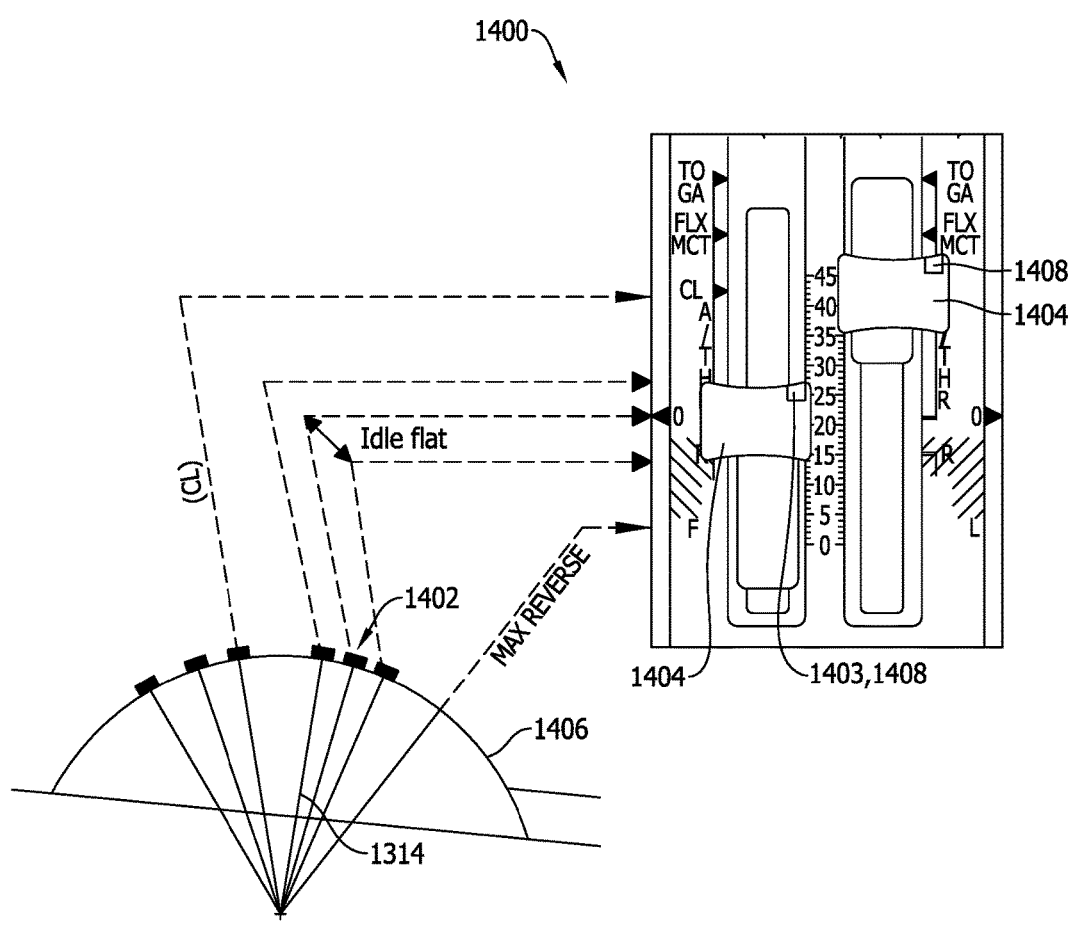

FIG. 13 is a graph 1300 of thrust versus throttle lever for a throttle device 1400 that may be used with ducted propulsion assembly 200 (shown in FIG. 2). FIG. 14 is a perspective view and a schematic view of throttle device 1400. In the example embodiment, graph 1300 includes an x-axis 1302 graduated in units of throttle level and a y-axis 1304 graduated in units of thrust of ducted propulsion assembly 200. A trace 1305 illustrates a response of thrust to various positions of throttle device 1400. Throttle device 1400 is divided into a plurality of throttle level regions. In the example embodiment, throttle device 1400 includes a forward thrust throttle level region 1306, a reverse thrust throttle level region 1308, and an idle thrust throttle level region 1310. An idle flat region 1312 and an intermediate thrust reverser deployment region 1314 are included within idle thrust throttle level region 1310. In the exemplary embodiment, throttle device 1400 includes a throttle handle 1404 moveable through an arcuate path 1406, and the throttle levels on x-axis 1302 correspond to angular positions of throttle handle 1404. In other embodiments, throttle device 1400 defines the throttle levels in any suitable fashion.

When throttle device 1400 is positioned in intermediate thrust reverser deployment region 1314, thrust reverser assembly 202 is operated in an intermediate forward thrust mode of operation. Actuator assemblies 316 (shown in FIGS. 3-5) or, alternatively, actuator assemblies 610 (shown in FIGS. 6-8) are operable in the intermediate forward thrust mode to modulate a position of moveable portion 306 or moveable portion 607, respectively, along the continuous range of travel of the moveable portion, such that fan duct bleed airflow portion 329 through thrust reverser bleed passage 322 is correspondingly varied, as described above. In one embodiment, throttle device 1400 is positioned to a first position 1402 associated with a ground idle power level in region 1310, such as by moving throttle handle 1404 of throttle device 1400 to a corresponding position along arcuate path 1406, and throttle device 1400 is then actuated into a second position 1403 associated with the intermediate forward thrust mode of operation in region 1314.

In various embodiments, throttle device 1400 is actuated into second position 1403 by a secondary throttle action that is actuated separately and differently from movement of throttle device 1400 into first position 1402. The separate and different actuation of throttle device 1400 into second position 1403 ensures that the intermediate forward thrust mode of operation is not inadvertently entered into, and allows for traditional operation of throttle device 1400 in accordance with existing operations when the intermediate forward thrust mode of operation is not desired. In some such embodiments, secondary position 1403 is actuated by movement of a component of throttle device 1400 other than the component of throttle device 1400 that is actuated to reach first position 1402. For example, second position 1403 is defined by an operation of a switch 1408 while throttle handle 1404 is positioned at first position 1402. Alternatively, in some such embodiments, secondary position 1403 is actuated by movement of the same component of throttle device 1400 actuated to reach first position 1402, but the movement is of a different type or direction. For example, second position 1403 is defined by a pulling up, or radially outward perpendicular to arcuate path 1406, on throttle handle 1404 after throttle handle 1404 is moved along arcuate path 1406 to first position 1402. In alternative embodiments, throttle device 1400 is actuated to second position 1403 in any suitable fashion.

Figure 15:
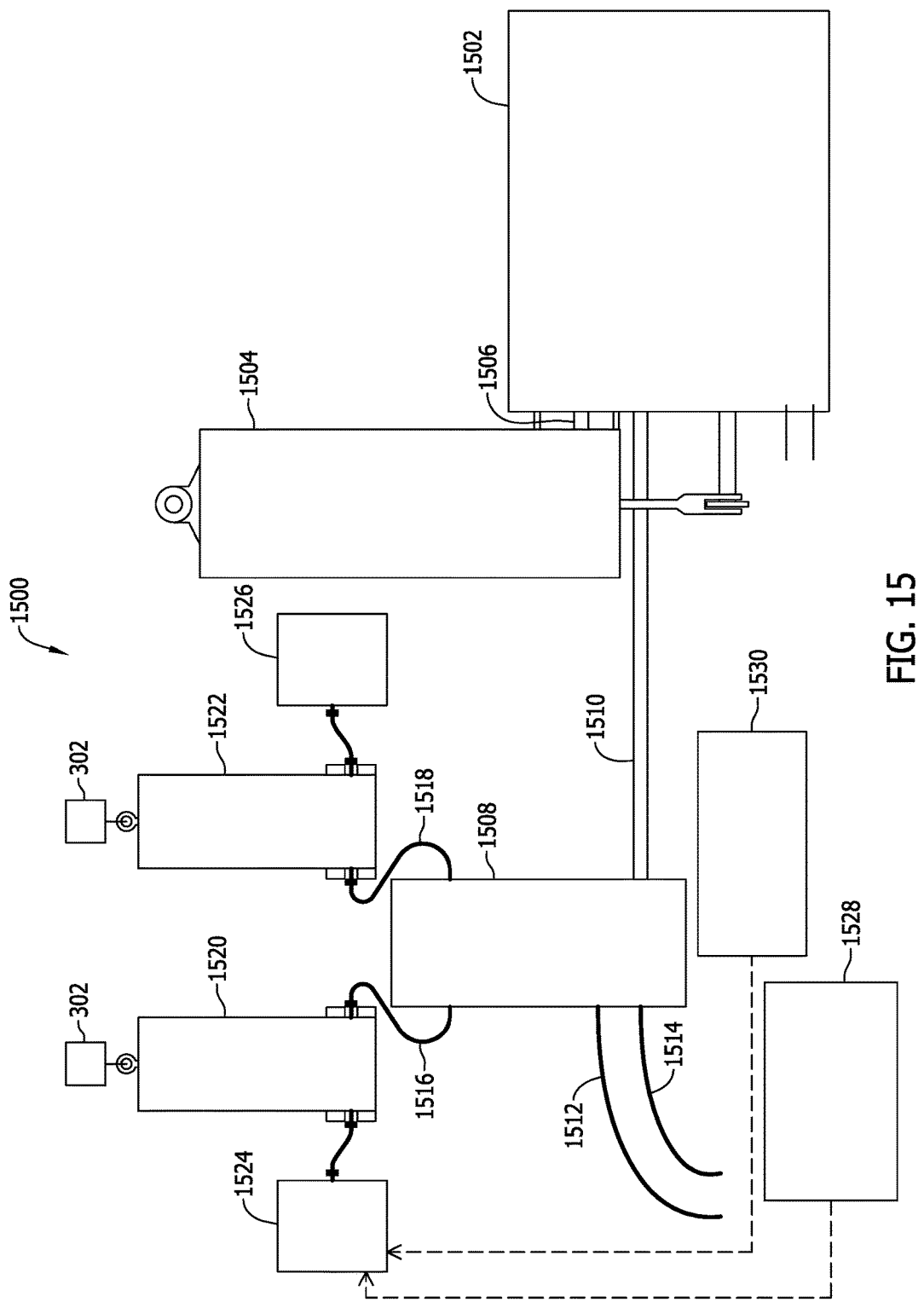

FIG. 15 is a schematic view of an embodiment of a thrust reverser control system 1500 that may be used with ducted propulsion assembly 200 (shown in FIG. 2). In the example embodiment, components of thrust reverser control system 1500 provide redundant safety locks to prevent unintended deployment of thrust reverser assembly 202, 300. In the example embodiment, motive power for thrust reverser control system 1500 is delivered from a motor 1502, for example, a fluid motor, such as, but not limited to a hydraulic motor or air motor, or by an electrical motor. A center drive unit 1504 is coupled to motor 1502 through a first shaft 1506. Center drive unit 1504 is also coupled to a gearbox 1508 through a second shaft 1510. Rotation power is transmitted to or from center drive unit 1504 through one or more flexible shafts 1512, 1514 to power other equipment or to receive power from a source other than motor 1502. Additional flexible shafts 1516, 1518 are used to transmit rotational power from gearbox 1508 to a plurality of actuators 318, such as, an upper end actuator 1520 and a lower end actuator 1522. Each actuator 1520, 1522 is coupled to a respective door 302 (shown in FIGS. 3-5). Operation of upper end actuator 1520 and lower end actuator 1522 causes respective doors 302 to operate to stow, deploy, or operate thrust reverser assembly 300 in intermediate positions (shown in FIG. 5). Each actuator 1520 and 1522 is coupled to an associated actuator lock 1524, 1526. When in a locked position, redundant actuator locks 1524, 1526 prevent upper end actuator 1520 and lower end actuator 1522 from operating to deploy thrust reverser assembly 300. Actuator locks 1524, 1526 are typically controlled automatically by one or more controllers or computing devices, such as, but not limited to a Full Authority Digital Electronic Control (FADEC) and/or an Engine Interface Control Unit (EICU). The FADEC or first computing device 1528 and/or the EICU or second computing device 1530 may be embodied in standalone computing devices or may be embodied as portions or subsystems of larger computing devices and may be distributed amongst a plurality of computing devices. In addition to actuator locks 1524, 1526, additional safety locks may be used with gearbox 1508, center drive unit 1504, and/or motor 1502.

Figure 16:
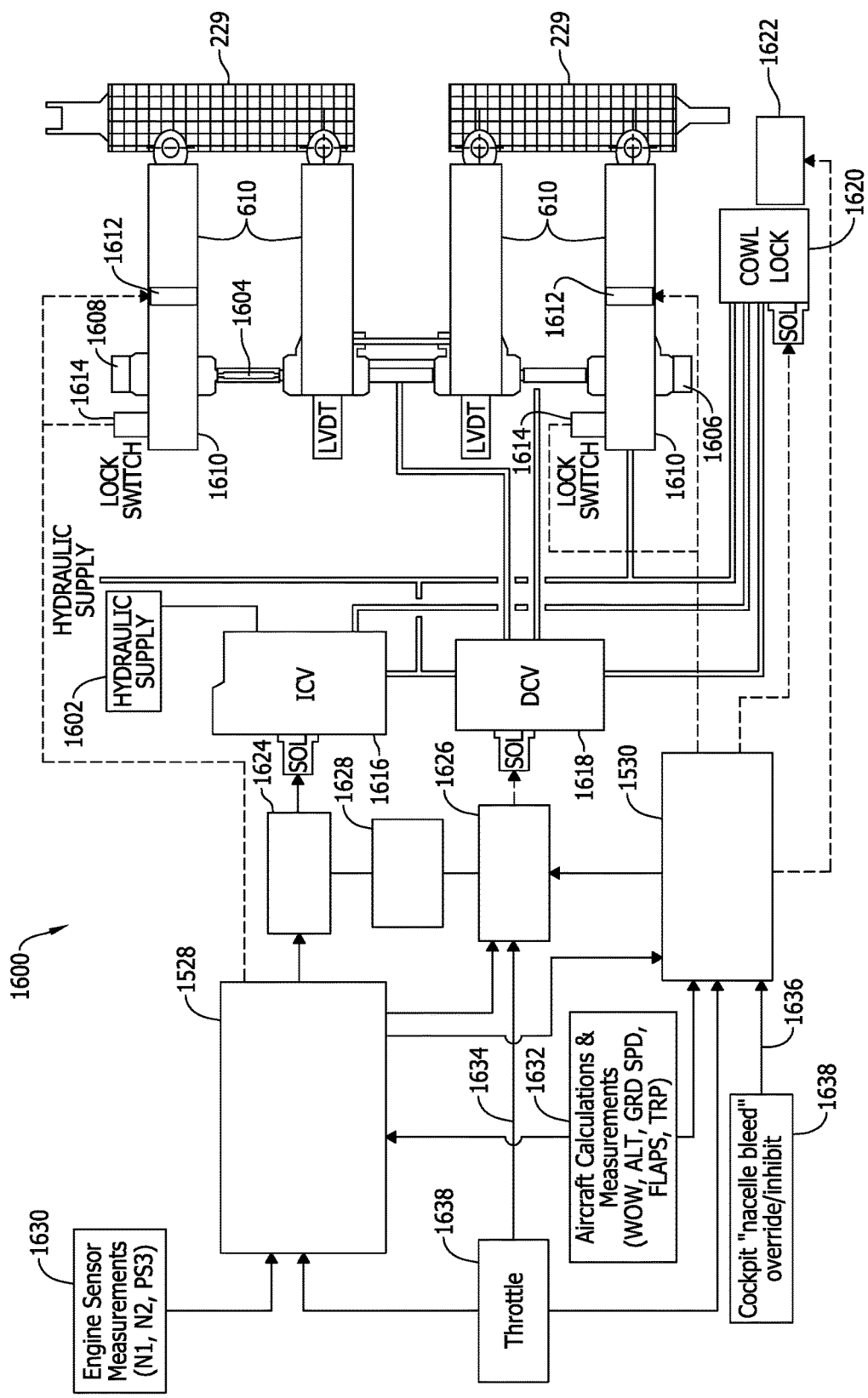

FIG. 16 is a schematic view of an embodiment of a thrust reverser control system 1600 that may be used with ducted propulsion assembly 200 (shown in FIG. 2). In the example embodiment, components of thrust reverser control system 1600 provide redundant safety locks to prevent unintended deployment of thrust reverser assembly 202, 600. In the example embodiment, motive power for thrust reverser control system 1600 is delivered from a hydraulic supply system 1602 coupled in flow communication with thrust reverser control system 1600. In other embodiments, motive power for thrust reverser control system 1600 is electrical power.

An electronic control system, which may be embodied in for example, first computing device 1528 and/or second computing device 1530, controls movement of transcowls 229 from a locked and stowed position to an unlocked and deployed position for producing reverse thrust and/or a reduced forward thrust, and returns transcowls 229 from the deployed position back to the stowed and locked position. Thrust reverser control system 1600 includes a plurality of actuator assemblies 610, each actuator assembly 610 coupled to a respective transcowl 229, and interconnected by one or more synchronization mechanisms 1604 and associated synchronization mechanism locks 1605. Each of actuator assemblies 610 is driven by one or more power sources. The one or more power sources may be embodied in, for example, hydraulic supply system 1602, a pneumatic power source 1606, or an electric power source 1608. As will be discussed in more detail below, one or more of actuator assemblies 610 includes a redundant locking mechanism that prevents unintended movement of transcowls 229 from the stowed or intermediate position.

In the example embodiment, at least some actuator assemblies 610 include an actuator primary lock 1610 and/or an actuator intermediate lock 1612. Actuator primary lock 1610 is actuated using a lock switch 1614, which is controlled by first computing device 1528 and/or second computing device 1530. Actuator intermediate lock 1612 is also controlled by first computing device 1528 and/or second computing device 1530. In the example embodiment, actuator assemblies 610 are powered by hydraulic supply system 1602 through an isolation control valve (ICV) 1616 and a directional control valve (DCV) 1618. The operation of ICV 1616 and DCV 1618 and second computing device 1530 control a cowl lock 1620, which further prevents unintended operation of thrust reverser assembly 202, 600. Second computing device 1530 also controls an intermediate cowl lock 1622. Three independent locking mechanisms provide safety to prevent inadvertent deployment of thruster reverser system from the stowed or intermediate positions.

ICV 1616 and DCV 1618 are each electrically controlled through respective relays, ICV 1616 by an ICV ground relay 1624 and DCV 1618 through a DCV inhibit relay 1626. ICV ground relay 1624 and DCV inhibit relay 1626 are electrically supplied by an aircraft power system 1628.

In the example embodiment, first computing device 1528 and second computing device 1530 are configured to receive a plurality of signals representing sensed and virtual parameters of ducted propulsion assembly 200 and aircraft 100 using physical sensors and virtual sensors. Although the following features of first computing device 1528 and second computing device 1530 are described and illustrated with respect to FIG. 16, it should be understood that these features also apply to first computing device 1528 and second computing device 1530 as implemented in thrust reverser control system 1500 (shown in FIG. 15). First computing device 1528 is configured to receive signals representing, for example, engine sensor parameters 1630 including fan rotor speed, N1; core rotor speed, N2, and high-pressure compressor discharge static pressure, PS3. First computing device 1528 is also configured to receive signals representing, for example, aircraft parameters 1632 including weight on wheels WOW, ground speed, GRND SPD, altitude, ALT, flap position, FLAPS, and thrust reverser position, TRP. First computing device 1528 is also configured to receive a signal representing a throttle position or throttle level 1634 from throttle device 1400 as shown in FIG. 13. For example, throttle level 1634 indicates that throttle device 1400 is in first position 1402, second position 1403, or another position. Second computing device 1530 is configured to receive signals representing aircraft parameters 1632, throttle level 1634, and other measurements 1635 from first computing device 1528 including for example, engine sensor parameters 1630. Second computing device 1530 is also configured to receive signals representing a nacelle bleed auto/inhibit switch signal 1636 from a cockpit override system 1638 in cockpit 105 of aircraft 100 (shown in FIG. 1)

During operation on the ground, determined in various embodiments by weight-on-wheels WOW, operation in intermediate thrust reverser deployment region 1314 (shown in FIG. 13) is enabled, which permits partial deployment of thrust reverser assembly 202, 300, 600. Partial deployment of thrust reverser assembly 202, 300, 600 permits gas turbine engines 120 to generate a reduced amount of forward thrust at engine idle speed, as compared to operating gas turbine engines 120 at engine idle speed without partial deployment of thrust reverser assembly 202, 300, 600. Such reduced forward thrust while taxiing permits less usage of the brakes of aircraft 100, which tends to reduce wear on the brakes and a temperature of the brakes.

In various embodiments, aircraft ground speed (GRND SPD) and measured engine power level enables (1) unlocking of cowl lock 1620 and/or intermediate cowl lock 1622, (2) unlocking of synchronization mechanisms 1604 and associated synchronization mechanism locks 1605, and (3) a position on the thrust reverser actuator assemblies 316, 610 resulting in fan duct bleed airflow portion 329 being channeled through bleed passage 322 during forward thrust operation.

For flight-safety reasons, one or more of the actuators of actuator assembly 316, 610 used to move the thrust reversers include a plurality of locks to provide a redundant locking function to prevent unintended thrust reverser movement. In the example embodiment, such locks are embodied in, for example, actuator lock 1524, 1526, synchronization mechanism locks 1605, actuator primary lock 1610, actuator intermediate lock 1612, cowl lock 1620, and intermediate cowl lock 1622. Each of such locks are also affected by electrical controls and actuator motive power controls to provide redundant locking backup to meet regulatory requirements for thrust reverser transcowl retention.

Figure 17:
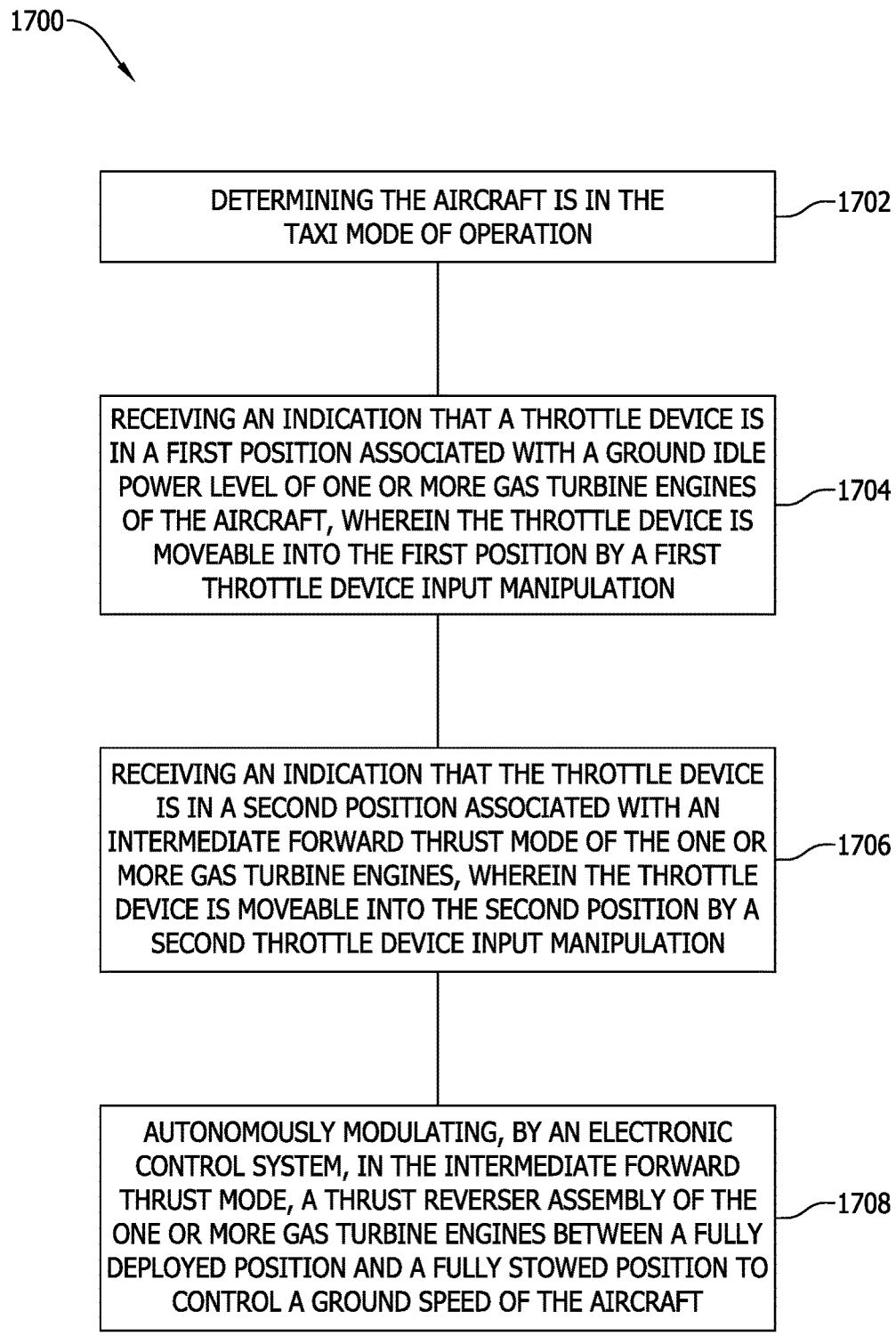

FIG. 17 is a flow diagram of a method 1700 of operating an aircraft during a taxi mode of operation. For example, method 1700 is executed by thrust reverser control system 1500 or thrust reverser control system 1600. In the example embodiment, method 1700 includes determining 1702 the aircraft is in the taxi mode of operation. In one embodiment, the pilot indicates that the aircraft is in the taxi mode of operation by setting a switch or inputting the taxi mode of operation into a control interface of aircraft 100 (shown in FIG. 1). Alternatively, the taxi mode of operation may be determined automatically by an algorithm that compares a behavior of aircraft 100 to stored behaviors consistent with the taxi mode of operation. The stored behaviors may be embodied in rules or look-up table elements stored in any of the computing devices associated with aircraft 100. At least some of the computing devices may be communicatively accessible to aircraft 100, but reside off-board of aircraft 100. The algorithm may receive indications of a weight-on-wheels and a ground speed of aircraft 100, which can be used to determine aircraft 100 is not in the air and that a speed of aircraft 100 is consistent with taxiing and not at a high enough speed that might indicate aircraft 100 had just landed or is on a take-off roll. The algorithm may also receive a position indication of thrust reverser assembly 202. Indication that thrust reverser assembly 202 was deployed would also indicate aircraft 100 is not taxiing but rather is just landing.

Method 1700 also includes receiving 1704 an indication that a throttle device, such as throttle device 1400 (shown in FIG. 14), is in a first position associated with a ground idle power level of one or more gas turbines of the aircraft. The throttle device is moveable into the first position by a first throttle device input manipulation. In the example embodiment, the first throttle device input manipulation includes translating throttle handle 1404 through arcuate path 1406, or alternatively through a linear or other non-arcuate path, to first position 1402. In other embodiments, the first throttle device input manipulation includes rotating throttle handle 1404 through a rotary path to first position 1402. Method 1700 further includes receiving 1706 an indication that the throttle device is in a second position associated with an intermediate forward thrust mode of operation of the one or more gas turbine engines. The throttle device is moveable into the second position by a second throttle device input manipulation. In the example embodiment, the second throttle input device manipulation includes pulling up on throttle handle 1404 while throttle handle 1404 is in first position 1402 to manipulate throttle device 1400 into second position 1403. In various embodiments, actuating a trigger or other switch 1408 can also be the second throttle input device manipulation.

Method 1700 also includes modulating 1708, in the intermediate forward thrust mode, a thrust reverser assembly 202, 300, 600 between a fully deployed position and a fully stowed position, as described above, to control a ground speed of aircraft 100. Using thrust reverser assembly 202, 300, 600 between a fully deployed position and fully stowed position to control a ground speed of aircraft 100 limits wear on the brakes of aircraft 100, which saves on maintenance cost associated with the brakes including parts, labor, scheduling maintenance activities, and a cost associated with aircraft 100 being idle. In the example embodiment, aircraft 100 includes ducted propulsion assembly 200 that includes fan duct 234 that includes fan nozzle outlet 224 and a bleed passage 322. Modulating the thrust reverser assembly between the fully deployed position and the fully stowed position to control a ground speed of aircraft 100 is accomplished by simultaneously varying a first amount of air, such as gap airflow portion 325 of air flowing through fan duct 234, exhausted from fan nozzle outlet 224 and a second amount of air, such as fan duct bleed airflow portion 329, bled through bleed passage 322.

The above-described thrust reverser systems provide an efficient method for modulating fan duct bleed through the aircraft thrust reverser during taxi operations on the ground. Specifically, the above-described modulated fan duct bleed includes modified thrust reverser controls to permit an infinitely and continuously variable amount of air to be bled from the gas turbine engine fan duct during taxi operations. The bled air does not provide forward thrust and may or may not provide any reverse thrust to the gas turbine engine. The bled air will reduce the forward thrust generated by the gas turbine engine.

As used herein, "virtual sensor" may refer to a mathematical algorithm or model that produces output measures comparable to a physical sensor based on inputs from other systems, such as physical sensors. In various embodiments, "virtual sensors" are software constructs that receive input from one or more physical sensors and use such inputs to compute a process parameter at a location of the virtual sensor where a physical sensor for that parameter does not exist, is not practical, or has become inoperable.

An exemplary technical effect of the methods, systems, and apparatus described herein includes at least one of: (a) determining the aircraft is in the taxi mode of operation, (b) receiving an indication that a throttle device is in a first position associated with a ground idle power level of one or more gas turbine engines of the aircraft, wherein the throttle device is moveable into the first position by a first throttle device input manipulation, (c) receiving an indication that the throttle device is in a second position associated with an intermediate forward thrust mode of the one or more gas turbine engines, wherein the throttle device is moveable into the second position by a second throttle device input manipulation, and (d) modulating a thrust reverser assembly between a fully deployed position and fully stowed position to control a ground speed of the aircraft.

The above-described embodiments of a method and system of reducing a gas turbine engine forward thrust below an engine idle amount of forward thrust provides a cost-effective and reliable means for reducing aircraft brake wear and subsequent maintenance parts and labor costs. Typically during taxi operations at engine idle, engine thrust may not be low enough to manage aircraft taxi speed causing the aircraft brakes to be used. Such usage increases a wear on the brakes, shortening their life. As a result, the methods and systems described herein facilitate reducing aircraft parts and labor expenses in a cost-effective and reliable manner.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A thrust reverser assembly for an aircraft comprising:
a stationary forward cowl, a moveable portion downstream from the stationary forward cowl, and a fixed ferrule downstream of the moveable portion, the moveable portion including at least one door pivotally mounted about an axis of rotation and moveable over a continuous range of travel between a fully stowed position and a fully deployed position, wherein movement away from said fully stowed position opens a thrust reverser bleed passage and causes a downstream portion of the at least one door to at least partially block a fan duct thereby forcing a portion of fan duct air through the thrust reverser bleed passage;
one or more actuator assemblies coupled to said moveable portion and operable in an intermediate forward thrust mode to modulate a position of said moveable portion along said continuous range of travel, such that an air flow through said thrust reverser bleed passage is correspondingly varied;
a throttle device comprising a first position associated with a ground idle power level and a second position associated with the intermediate forward thrust mode, wherein movement of said throttle device into said second position is actuated separately and differently from movement of said throttle device into said first position; and
an actuator intermediate lock coupled to said one or more actuator assemblies and configured to inhibit actuation of the intermediate forward thrust mode until a plurality of preconditions are met.

2. The thrust reverser assembly of claim 1, wherein said plurality of preconditions include a weight-on-wheels indication, and a ground speed greater than zero and less than a predetermined take-off speed.

3. The thrust reverser assembly of claim 1, wherein said throttle device is positionable to said first position by moving a throttle handle of said throttle device through an arcuate path.

4. The thrust reverser assembly of claim 1, wherein said throttle device is positionable to said second position by moving a throttle handle of said throttle device through a non-arcuate path.

5. The thrust reverser assembly of claim 1, wherein said throttle device is positionable to said first position by moving a throttle handle of said throttle device through an arcuate path and wherein said throttle device is positionable to said second position by moving said throttle handle of said throttle device perpendicular to the arcuate path.

6. The thrust reverser assembly of claim 1, wherein said thrust reverser assembly is configured to move to said fully stowed position when said throttle device is moved away from said first position or said second position.

7. The thrust reverser assembly of claim 1, wherein said one or more actuator assemblies are powered from at least one of a hydraulic supply system, a pneumatic power source, and an electric power source.

8. The thrust reverser assembly of claim 1, further configured to control a direction of air discharged from said thrust reverser bleed passage using at least one of a cascade assembly, an open section of said cascade assembly, a blanked-off section of said cascade assembly, and a pivoting door assembly having decoupled synchronization.

9. A method of operating an aircraft during a taxi mode of operation, said method comprising:
determining the aircraft is in the taxi mode of operation, wherein determining the aircraft is in the taxi mode of operation comprises determining that a received ground speed signal is greater than approximately zero forward speed and less than a predetermined threshold speed range determined based on a critical take-off speed of the aircraft;

receiving an indication that a throttle device is in a first position associated with a ground idle power level of one or more gas turbine engines of the aircraft, wherein the throttle device is moveable into the first position by a first throttle device input manipulation;

receiving an indication that the throttle device is in a second position associated with an intermediate forward thrust mode of the one or more gas turbine engines, wherein the throttle device is moveable into the second position by a second throttle device input manipulation; and autonomously modulating, by an electronic control system, in the intermediate forward thrust mode, a thrust reverser assembly of the one or more gas turbine engines between a fully deployed position and a fully stowed position to control a ground speed of the aircraft.

10. The method of claim 9, wherein determining the aircraft is in the taxi mode of operation comprises receiving an engine power level indication that is less than a predetermined range.

11. The method of claim 9, wherein receiving the indication that the throttle device is in the second position comprises receiving the indication from the throttle device having the second throttle device input manipulation different from the first throttle device input manipulation.

12. The method of claim 9, wherein modulating the thrust reverser assembly comprises operating an actuator assembly of the thrust reverser assembly to position a moveable portion of the thrust reverser assembly in a plurality of intermediate positions between the fully stowed position and the fully deployed position.

13. The method of claim 9, wherein the aircraft includes a ducted propulsion assembly including a fan duct that includes a fan nozzle outlet and a bleed passage and wherein modulating the thrust reverser assembly comprises simultaneously varying a first amount of air exhausted from the fan nozzle outlet and a second amount of air bled through the bleed passage.

14. A thrust reverser assembly comprising:
a fan duct configured to channel a flow of air from an inlet opening to a fan nozzle outlet, said fan duct including a bleed passage configured to channel a portion of the flow of air to ambient;
a moveable portion having at least one door pivotally mounted about an axis of rotation and moveable over a continuous range of travel between a fully stowed position where the at least one door covers the bleed passage and a fully deployed position where the at least one door does not block the bleed passage;
an actuator assembly connected to the moveable portion and selectively operable to continuously vary an amount of the portion of the flow of air channeled through said bleed passage through movement of the moveable portion, wherein movement away from said fully stowed position opens the bleed passage and causes a downstream portion of the at least one door to at least partially block the fan duct thereby forcing a portion of fan duct air through the bleed passage; and
an actuator lock operatively coupled to said actuator assembly, said actuator lock configured to selectively prevent said actuator assembly from modulating between a fully stowed position and a fully deployed position.

15. The thrust reverser assembly of claim 14, further comprising an actuator intermediate lock coupled to said actuator assembly and configured to inhibit actuation of an intermediate forward thrust mode of operation until a plurality of preconditions are met.

16. The thrust reverser assembly of claim 14, further comprising a controller configured to receive aircraft parameters including at least one of weight on wheels, ground speed, altitude, flap position, and thrust reverser position.

17. The thrust reverser assembly of claim 14, further comprising a synchronizing system configured to control relative positions of actuators of said actuator assembly wherein said actuator assembly is lockable between the fully stowed position and any of a plurality of intermediate positions using an actuator lock on the synchronizing system, said actuator lock configured to prevent said actuator assembly from moving from each intermediate position to the fully deployed position.

* * * * *